United States Patent
Kanie et al.

(10) Patent No.: US 9,502,725 B2
(45) Date of Patent: Nov. 22, 2016

(54) FUEL CELL SYSTEM WITH CONNECTOR WELDING PREVENTION

(75) Inventors: Naoki Kanie, Toyota (JP); Shohei Okamoto, Nisshin (JP); Katsuhiro Matsushima, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1113 days.

(21) Appl. No.: 13/376,979

(22) PCT Filed: Jun. 9, 2009

(86) PCT No.: PCT/JP2009/060491
§ 371 (c)(1),
(2), (4) Date: Dec. 8, 2011

(87) PCT Pub. No.: WO2010/143260
PCT Pub. Date: Dec. 16, 2010

(65) Prior Publication Data
US 2012/0086278 A1  Apr. 12, 2012

(51) Int. Cl.
*H02J 1/00* (2006.01)
*H01M 8/04* (2016.01)

(52) U.S. Cl.
CPC ....... *H01M 8/04559* (2013.01); *H01M 8/0488* (2013.01); *H01M 2250/20* (2013.01); *Y02E 60/50* (2013.01); *Y02T 90/32* (2013.01); *Y10T 307/625* (2015.04)

(58) Field of Classification Search
CPC ............ H01H 3/001; H01M 8/04559; H01M 8/0488
USPC ................................................ 307/130, 10.1
See application file for complete search history.

(56) References Cited

U.S. PATENT DOCUMENTS

| | | | |
|---|---|---|---|
| 6,369,461 B1 * | 4/2002 | Jungreis et al. | 307/46 |
| 6,628,011 B2 * | 9/2003 | Droppo et al. | 307/43 |
| 6,777,909 B1 * | 8/2004 | Aberle et al. | 320/104 |
| 2003/0029654 A1 | 2/2003 | Shimane et al. | |

FOREIGN PATENT DOCUMENTS

| | | |
|---|---|---|
| DE | 10235489 A1 | 7/2003 |
| JP | 09-238470 A | 9/1997 |
| JP | 2003102101 A * | 4/2003 |

(Continued)

OTHER PUBLICATIONS

International Search Report mailed Sep. 8, 2009 of PCT/JP2009/060491.

*Primary Examiner* — Daniel Cavallari
(74) *Attorney, Agent, or Firm* — Andrews Kurth Kenyon LLP (57) ABSTRACT

Weld of a relay provided on an electric power supply path can be suppressed. When a fuel cell system starts, a controller sets an output voltage of a Bat converter at an open circuit voltage of a battery and sets an output voltage of a FC converter at an open circuit voltage of a fuel cell. When the output voltage of the FC converter is lower than the output voltage of the Bat converter, the controller controls to boost the output voltage of the FC converter to the output voltage of the Bat converter. On the other hand, when the output voltage of the FC converter is the output voltage of the Bat converter or more, the controller controls to boost the output voltage of the Bat converter to the output voltage of the FC converter. When the output voltage difference between the FC converter and the Bat converter is a predetermined value or less capable of turning the FC relays ON without causing welding of the FC relays, the controller turns the FC relays ON.

4 Claims, 6 Drawing Sheets

(56) References Cited

FOREIGN PATENT DOCUMENTS

| | | |
|---|---|---|
| JP | 2004-311090 A | 11/2004 |
| JP | 2006-158173 A | 6/2006 |
| JP | 2006-304481 A | 11/2006 |
| JP | 2006-340419 A | 12/2006 |
| JP | 2007-318938 A | 12/2007 |
| JP | 2008-226594 A | 9/2008 |

* cited by examiner

FUEL CELL SYSTEM WITH CONNECTOR WELDING PREVENTION

This is a 371 national phase application of PCT/JP2009/060491 filed 9 Jun. 2009, the contents of which are incorporated herein by reference.

TECHNICAL FIELD

The present invention relates to fuel cell systems.

BACKGROUND ART

The following Patent Document 1 discloses a fuel cell system to drive a load using a fuel cell and a battery, the fuel cell system including two converters for the fuel cell and the battery. This fuel cell system makes the converter for fuel cell and the converter for battery operate in a coordinated manner so as to supply electric power to the load stably. The system is provided with a relay as a connector on an electric power supply path to connect the battery and the load. The system is configured to turn off the relay when the system stops and to turn on the relay to connect the battery with the load when the system starts and a voltage supplied to the load from the fuel cell exceeds a battery voltage. This configuration prevents wasteful consumption of battery power during the system stop as well as rush current from flowing to the load side from the battery side at the time of relay connection.

PRIOR ART DOCUMENT

Patent Document

Patent Document 1: JP2006-340419 A

SUMMARY OF THE INVENTION

Problem to be Solved by the Invention

In the aforementioned Patent Document 1, the relay is turned on when the voltage on the fuel cell side exceeds the voltage on the battery side, and therefore the relay may be welded depending on the voltage difference across the relay.

In order to cope with the problem of the conventional technique, it is an object of the present invention to provide a fuel cell system capable of suppressing weld of a connector provided on an electric power supply path.

Means for Solving the Problem

In order to solve the aforementioned problem, a fuel cell system according to the present invention includes: a fuel cell that receives fuel gas and oxidation gas and generates electric power through electrochemical reaction of the fuel gas and the oxidation gas; a storage section capable of charging with the electric power generated at the fuel cell; an electric power consumption device that consumes electric power from the fuel cell and the storage section; a first voltage converter disposed between the fuel cell and the electric power consumption device; a second voltage converter disposed between the storage section and the electric power consumption device; a connector that connects or disconnects a path, the path supplying electric power from the first voltage converter to the electric power consumption device and coupling the first voltage converter and the second voltage converter; and a control means that controls connection or disconnection of the path supplying electric power by the connector. When the system starts, the control means controls an output voltage difference between the first voltage converter and the second voltage converter to be a predetermined value or less and then connects the path.

This configuration enables an output voltage difference between the first voltage converter and the second voltage converter to be a predetermined value or less before connecting an electric power supply path when the system starts. Therefore, the connector can be connected after the voltage difference across the connector becomes a voltage difference not causing welding at the connector.

In the fuel cell system, the control means may control the output voltage difference to be a predetermined value or less by boosting an output voltage of the first voltage converter.

This configuration enables the adjustment of the output voltage difference between the first voltage converter and the second voltage converter to be a predetermined value or less while boosting the output voltage of the first voltage converter.

In the fuel cell system, the output voltage difference may be controlled to be a predetermined value or less by, when an open circuit voltage of the fuel cell is lower than an open circuit voltage of the storage section, boosting an output voltage of the first voltage converter to the open circuit voltage of the storage section.

When the open circuit voltage of the fuel cell is lower than the open circuit voltage of the storage section, this configuration enables the adjustment of the output voltages of the first voltage converter and the second voltage converter to the open circuit voltage of the fuel cell that is a higher voltage.

In the fuel cell system, the control means may control the output voltage difference to be a predetermined value or less by, when an output voltage of the first voltage converter is lower than a minimum voltage that can be boosted by the second converter, boosting the output voltage of the first converter to the minimum voltage and boosting an output voltage of the second voltage converter to the minimum voltage.

When the output voltage of the first voltage converter is lower than the minimum voltage that can be boosted by the second voltage converter, this configuration enables the adjustment of the output voltages of the first voltage converter and the second voltage converter to the minimum voltage that can be boosted by the second voltage converter.

In the fuel cell system, the control means may control to consume electric power of the storage section so as to make the output voltage difference a predetermined value or less.

This configuration enables the adjustment of the output voltage difference between the first voltage converter and the second voltage converter to be a predetermined value or less while controlling to consume electric power of the storage section.

Effect of the Invention

According to the present invention, weld of a connector provided on an electric power supply path can be suppressed.

MODE FOR CARRYING OUT THE INVENTION

Referring now to the attached drawings, preferable embodiments of a fuel cell system according to the present invention are described below. Each embodiment below illustrates a fuel cell system according to the present invention that is used as a car-mounted power generation system for fuel cell hybrid vehicles (FCHV). The fuel cell system according to the present invention is applicable also to various mobile objects (robots, ships, airplanes and the like) other than FCHV as well as to stationary power generation systems used for power generation equipment for buildings (houses, buildings and the like).

Embodiment 1

Figure 1:
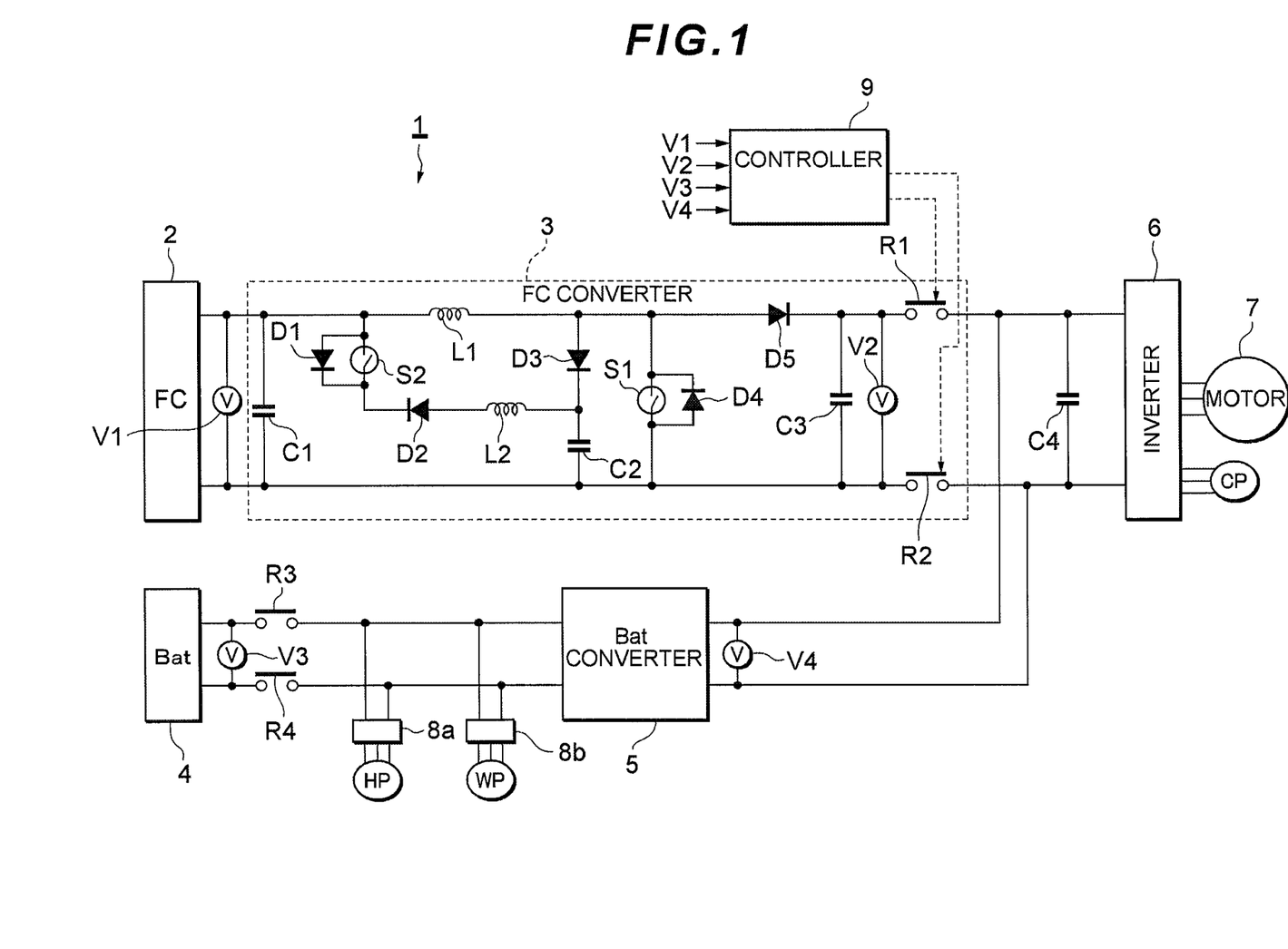
FIG. 1 schematically illustrates the configuration of a fuel cell system in one embodiment.

Referring firstly to FIG. 1, the configuration of a fuel cell system in Embodiment 1 is described. FIG. 1 schematically illustrates the fuel cell system in Embodiment 1.

As illustrated in the drawing, the fuel cell system 1 includes: a fuel cell 2 generating electric power by electro-chemical reaction of oxidation gas and fuel gas as reactant gas; a FC converter 3 as a DC/DC converter for fuel cell; a battery 4 (storage section) as a secondary battery; a Bat converter 5 (second voltage converter) as a DC/DC converter for battery; a traction inverter 6 as a load; a traction motor 7 (power consumption device), auxiliary inverters 8a, 8b and a controller 9 (control means) to control the system as a whole. A set of the fuel cell 2 and the FC converter 3 and a set of the battery 4 and the Bat converter 5 are connected in parallel with the traction inverter 6 and the traction motor 7.

The fuel cell 2 may be a high-polymer electrolyte fuel cell, for example, having a stack structure including the lamination of a lot of single cells. Each single cell has an air electrode on one face of an electrolyte film made of an ion-exchange film and a fuel electrode on the other face, and further has a pair of separators sandwiching the air electrode and the fuel electrode from both sides. In this case, hydrogen gas is supplied to a hydrogen gas path of the one separator and oxidation gas is supplied to an oxidation gas path of the other separator. These reactant gases react chemically to generate electric power. The fuel cell 2 is provided with a voltage sensor V1 to detect an output voltage of the fuel cell 2.

The FC converter 3 is a DC voltage converter, having a function to boost a DC voltage input from the fuel cell 2 and output the resultant to the traction inverter 6 and the traction motor 7. This FC converter 3 controls the output voltage of the fuel cell 2.

The FC converter 3, for example, includes: a capacitor C1 to smooth the DC voltage input from the fuel cell 2; a coil L1 to boost the DC voltage; a main switch S1; a capacitor C2 and a coil L2 configuring a resonance circuit; a resonance switch S2 to turn ON/OFF the resonance circuit and a capacitor C3 to smooth the output voltage of the FC converter 3. These elements configure a first voltage converter to boost a DC voltage input from the fuel cell 2 and output the resultant to the traction inverter 6 and the traction motor 7. The FC converter 3 further includes: a voltage sensor V2 to detect an output voltage of the FC converter 3; and FC relays R1, R2 (connector) to connect or disconnect an electric power supply path supplying electric power to the traction inverter 6 and the traction motor 7. The FC relays R1, R2 double as a connector to connect or disconnect a path coupling the FC converter 3 with the Bat converter 5.

The battery 4 including the lamination of battery cells has a terminal battery of a fixed high voltage, and is capable of charging with surplus power of the fuel cell 2 and auxiliary-supplying electric power under the control of a battery computer not illustrated. The battery 4 includes: a voltage sensor V3 to detect the output voltage of the battery 4; and Bat relays R3, R4 to connect or disconnect a path supplying battery power to the traction inverter 6 and the traction motor 7. The Bat relays R3, R4 are turned ON when the fuel cell system 1 starts, and are turned OFF when the fuel cell system 1 stops.

The Bat converter 5 is a DC voltage converter and has a function to adjust (boost) a DC voltage output from the battery 4 and output the resultant to the traction inverter 6 and the traction motor 7 and a function to adjust (lower) a DC voltage output from the fuel cell 2 or the traction motor 7 and output the resultant to the battery 4. Such functions of the Bat converter 5 enable discharge and charge of the battery 4. The Bat converter 5 is provided with a voltage sensor V4 to detect an output voltage of the Bat converter 5.

The traction inverter 6 converts a DC current to a three-phase AC current, and supplies the resultant to the traction motor 7 and a motor of a compressor CP. The traction motor 7 may be a three-phase AC motor, for example, and makes up a major power source for a FCHV including the fuel cell system 1. The auxiliary inverters 8a, 8b are a motor controller to control the driving of motors included in auxiliary devices such as a hydrogen pump HP and a coolant water pump WP, and converts a DC current to a three-phase AC current and supplies the resultant to each motor. The auxiliary inverters 8a, 8b may be a pulse-width modulation type PWM inverter, for example, and convert a DC voltage output from the battery 4 to a three-phase AC voltage in accordance with a control instruction from the controller 9 to control rotary torque generated at each motor.

The controller 9 detects a manipulation amount of an acceleration member (e.g., an accelerator pedal) provided in the FCHV and receives control information such as an acceleration request value (e.g., a requested power generation amount from a power consumption device such as the traction motor 7) to control the operations of various devices in the system. Examples of the power consumption device include, in addition to the traction motor 7, auxiliary devices required to operate the fuel cell 2 (e.g., motors of the compressor CP, the hydrogen pump HP and the coolant water pump WP), actuators used in various devices (a transmission, a wheel controller, a steering device, a suspension and the like) relating to the traveling of the vehicle, an air-conditioner in a passenger room, lighting, and an audio system.

The controller 9 physically includes a CPU, a memory and an I/O interface, for example. The memory includes a ROM storing control programs and control data processed by the CPU and a RAM mainly used for various working spaces for control processing. These elements are connected mutually via a bus. The I/O interface is connected with various sensors such as voltage sensors and various drivers to drive the traction motor 7 and the like.

The CPU receives detection results at the various sensors via the I/O interface and processes the detection results using various data in the RAM in accordance with the control programs stored in the ROM to execute various types of control processing in the fuel cell system 1. The CPU outputs a control signal to various drivers via the I/O interface to control the fuel cell system 1 as a whole.

The controller 9 controls ON/OFF of the FC relays R1, R2, for example. The controller 9 controls an output voltage difference between the FC converter 3 and the Bat converter 5 to be a predetermined value or less when the fuel cell system 1 starts, and then turns the FC relays R1, R2 ON. The predetermined value may be set within a range of a voltage difference capable of turning the FC relays R1, R2 ON so as not to cause welding of the FC relays R1, R2, and preferably is set at an upper limit of this range of the voltage difference. This range of voltage difference can be found by an experiment or the like. More specifically, the controller 9 controls the output voltage difference between the FC converter 3 and the Bat converter 5 to be the predetermined value or less in the following manner.

When the fuel cell system starts, the controller 9 sets the output voltage of the Bat converter 5 at an open circuit voltage of the battery 4 and sets the output voltage of the FC converter 3 at an open circuit voltage of the fuel cell 2. Subsequently, when the output voltage of the FC converter 3 is lower than the output voltage of the Bat converter 5, the controller 9 controls to boost the output voltage of the FC converter 3 to the open circuit voltage of the battery 4 that is the output voltage of the Bat converter 5. On the other hand, when the output voltage of the FC converter 3 is the output voltage of the Bat converter 5 or more, the controller 9 controls to boost the output voltage of the Bat converter 5 to the open circuit voltage of the fuel cell 2 that is the output voltage of the FC converter 3.

Thereafter, when the output voltage difference between the output voltage of the FC converter 3 and the output voltage of the Bat converter 5 is a predetermined value or less, the controller 9 turns the FC relays R1, R2 ON. As a result, the FC relays R1, R2 can be turned ON in the state where both ends of each of the FC relays R1, R2 are at a substantially same electric potential.

On the other hand, when this output voltage difference is the predetermined value or more, the controller 9 adjusts either the output voltage of the FC converter 3 or the output voltage of the Bat converter 5 until the output voltage difference is the predetermined value or less.

Figure 2:
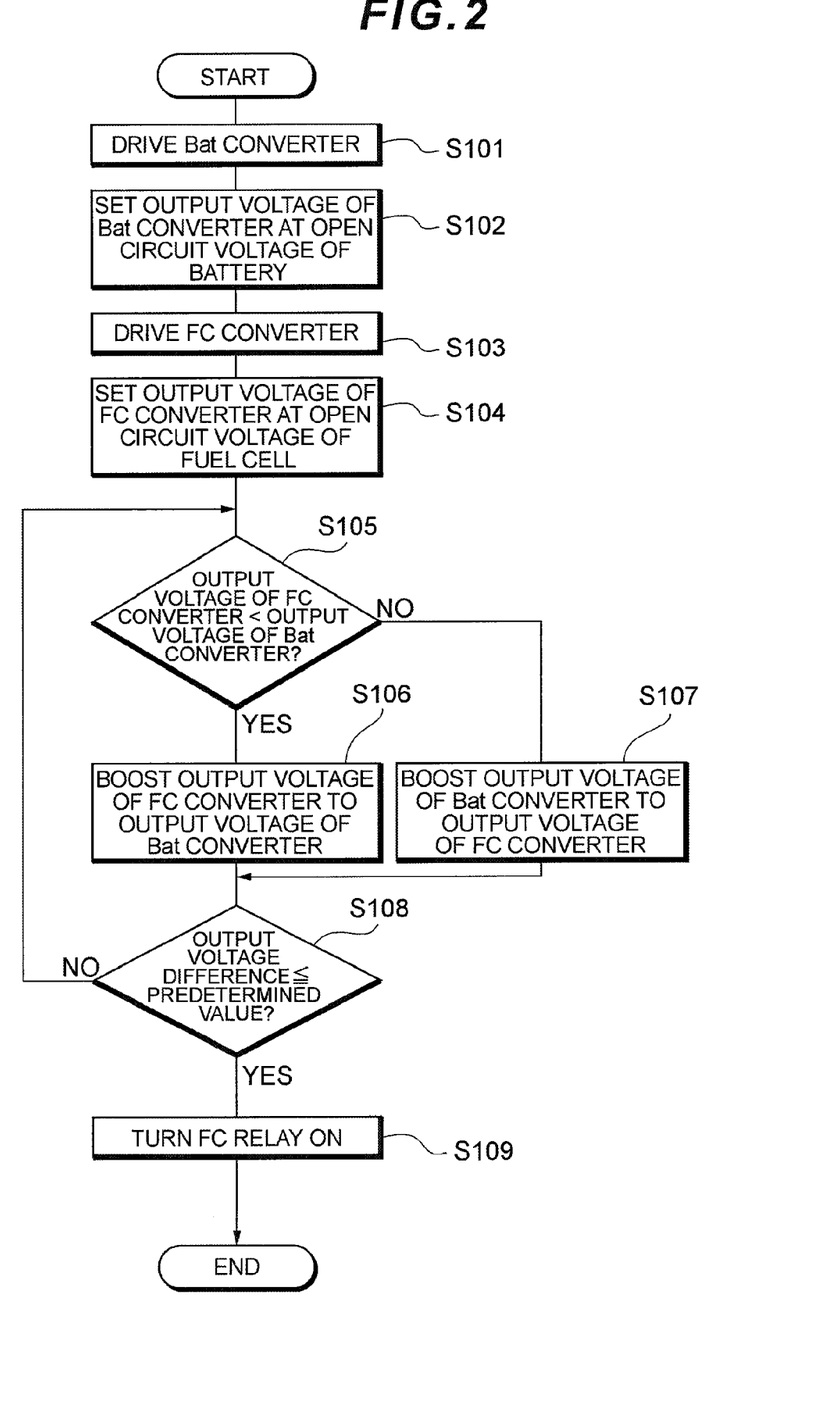
FIG. 2 is a flowchart to describe the flow of FC relay control processing in Embodiment 1.

Referring next to a flowchart of FIG. 2, the FC relay control processing in Embodiment 1 is described below. This FC relay control processing is started when an ignition key is turned ON, for example. When the ignition key is turned ON, the FC relays R1, R2 are in an OFF state.

Firstly, the controller 9 drives the Bat converter 5 (Step S101) and sets the output voltage of the Bat converter 5 at an open circuit voltage of the battery 4 (Step S102).

Subsequently, the controller 9 drives the FC converter 3 (Step S103), and sets the output voltage of the FC converter 3 at an open circuit voltage of the fuel cell 2 (Step S104).

Subsequently, the controller 9 determines whether the output voltage of the FC converter 3 is lower or not than the output voltage of the Bat converter 5 (Step S105). When this determination results in YES (YES at Step S105), the controller 9 controls to boost the output voltage of the FC converter 3 to the output voltage of the Bat converter 5 (Step S106). Then, the controller 9 shifts to the processing at Step S108 described later.

On the other hand, when the determination at Step S105 results in that the output voltage of the FC converter 3 is the output voltage of the Bat converter 5 or more (NO at Step S105), the controller 9 controls to boost the output voltage of the Bat converter 5 to the output voltage of the FC converter 3 (Step S107).

Subsequently, the controller 9 determines whether the output voltage difference between the FC converter 3 and the Bat converter 5 is a predetermined value or less (Step S108). When this determination results in NO (NO at Step S108), the controller 9 shifts to the processing at the aforementioned Step S105.

On the other hand, when the determination at Step S108 results in that the output voltage difference is the predetermined value or less (YES at Step S108), the controller 9 turns the FC relays R1, R2 ON (Step S109).

As stated above, when the open circuit voltage of the fuel cell 2 is lower than the open circuit voltage of the battery 4, the fuel cell system 1 of Embodiment 1 can adjust the output voltages of the FC converter 3 and the Bat converter 5 to the open circuit voltage of the fuel cell 2 that is a higher voltage while boosting the output voltage of the FC converter 3.

With this configuration, at the time of connection of an electric power supply path, after the output voltage difference between the FC converter 3 and the Bat converter 5 (voltage difference across the FC relays R1, R2) is set at a predetermined value or less capable of turning the FC relays R1, R2 ON without causing welding of the FC relays R1, R2, then the FC relays R1, R2 can be turned ON. As a result, the FC relays R1, R2 can be turned ON without welding.

Embodiment 2

The following describes Embodiment 2 of the present invention. When boosting a battery voltage, the Bat converter 5 shows an unstable boosting state before the voltage is boosted up to a voltage of a few tens of volts higher than the open circuit voltage of the battery 4. Therefore, the Bat converter 5 is configured not to perform a boosting operation when a boosting voltage width is smaller than a lower limit of a boosting voltage where the lower limit of a boosting voltage (hereinafter called "lower limit boosting voltage") is the aforementioned few tens of volts. In other words, the Bat converter 5 sets a voltage obtained by adding the lower limit boosting voltage to the open circuit voltage of the battery as a minimum voltage that can be boosted to perform a boosting operation.

When a difference between the open circuit voltage of the fuel cell 2 and the open circuit voltage of the battery 4 is the lower limit boosting voltage or more, the FC relay control processing in the aforementioned Embodiment 1 can be executed without problems. On the other hand, when the number of cells in the fuel cell 2 is decreased or conversely when the number of cells is increased so that the battery has a large battery capacity, for example, the difference between the open circuit voltage of the fuel cell 2 and the open circuit voltage of the battery 4 may be smaller than the lower limit boosting voltage. In such a case, even when the output voltage of the FC converter 3 is higher than the output voltage of the Bat converter 5, the output voltage of the Bat converter 5 cannot be boosted from the open circuit voltage of the battery 4 to the open circuit voltage of the fuel cell 2 because the voltage width to be boosted is smaller than the lower limit boosting voltage. Therefore, in this case, the FC relay control processing in the aforementioned Embodiment 1 will fail to turn the FC relays R1, R2 ON.

To cope with this, the fuel cell system 1 in Embodiment 2 controls the FC converter 3 and the Bat converter 5 to turn the FC relays R1, R2 ON even when the difference between the open circuit voltage of the fuel cell 2 and the open circuit voltage of the battery 4 is the lower limit boosting voltage or less.

The fuel cell system in Embodiment 2 has a similar configuration to that of the fuel cell system in Embodiment 1 illustrated in FIG. 1. Therefore, the same reference numerals are assigned to the constituent elements and the description thereof is omitted. In the following, different points from Embodiment 1 are mainly described.

When the fuel cell system 1 starts, the controller 9 sets the output voltage of the Bat converter 5 at an open circuit voltage of the battery 4 and sets the output voltage of the FC converter 3 at an open circuit voltage of the fuel cell 2. Subsequently, when the output voltage of the FC converter 3 is lower than the minimum voltage that can be boosted by the Bat converter 5, the controller 9 controls to boost the output voltages of the FC converter 3 and the Bat converter 5 to the minimum voltage that can be boosted by the Bat converter 5. On the other hand, when the output voltage of the FC converter 3 is the minimum voltage that can be boosted by the Bat converter 5 or more, the controller 9 controls to boost the output voltage of the Bat converter 5 to the open circuit voltage of the fuel cell 2 that is the output voltage of the FC converter 3.

Thereafter, when the output voltage difference between the output voltage of the FC converter 3 and the output voltage of the Bat converter 5 is a predetermined value or less, the controller 9 turns the FC relays R1, R2 ON. As a result, the FC relays R1, R2 can be turned ON while both ends of each of the FC relays R1, R2 are at a substantially same electric potential.

On the other hand, when this output voltage difference is the predetermined value or more, the controller 9 adjusts either the output voltage of the FC converter 3 or the output voltage of the Bat converter 5 until the output voltage difference is the predetermined value or less.

Figure 3:
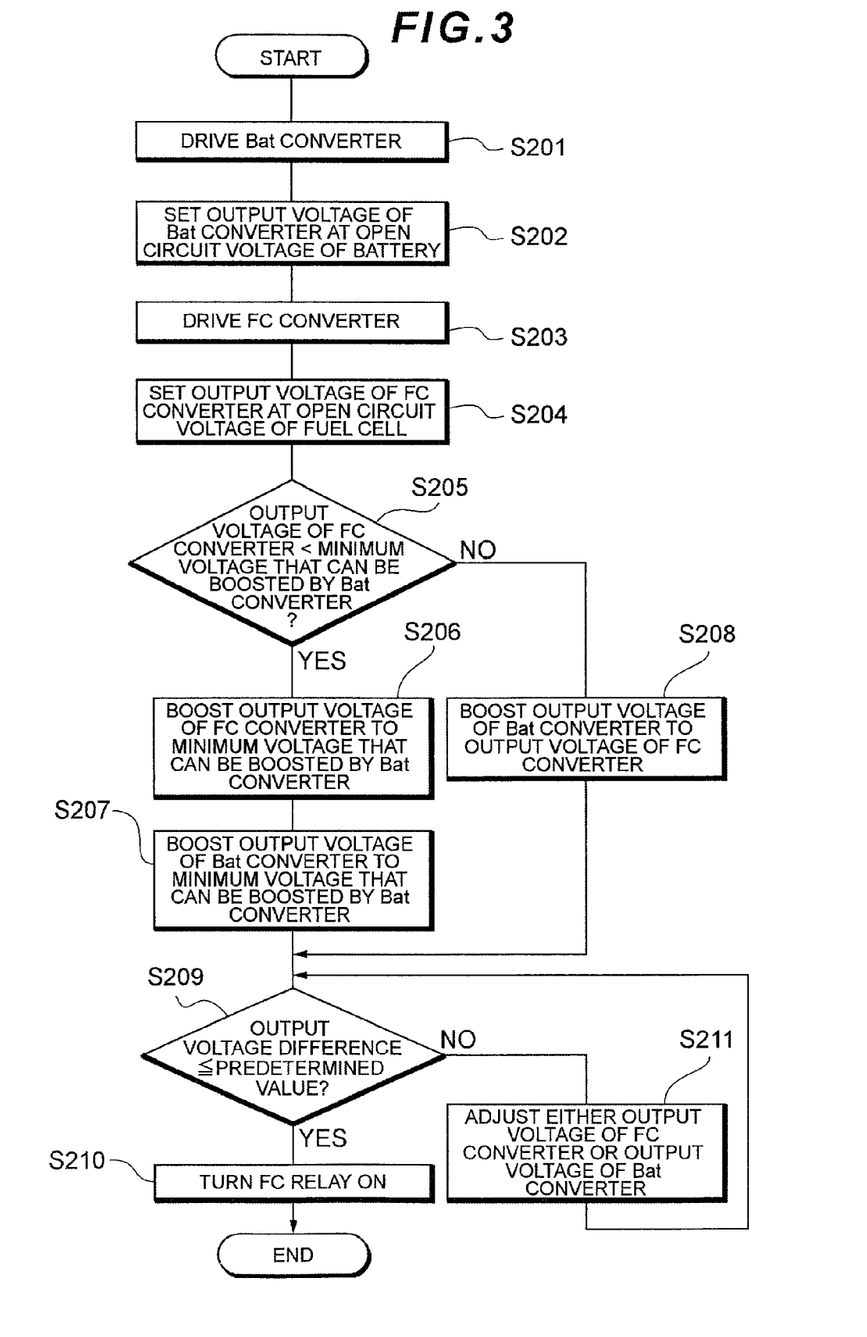
FIG. 3 is a flowchart to describe the flow of FC relay control processing in Embodiment 2.

Referring next to a flowchart of FIG. 3, the FC relay control processing in Embodiment 2 is described below. This FC relay control processing is started when an ignition key is turned ON, for example. When the ignition key is turned ON, the FC relays R1, R2 are in an OFF state.

Firstly, the controller 9 drives the Bat converter 5 (Step S201) and sets the output voltage of the Bat converter 5 at an open circuit voltage of the battery 4 (Step S202).

Subsequently, the controller 9 drives the FC converter 3 (Step S203), and sets the output voltage of the FC converter 3 at an open circuit voltage of the fuel cell 2 (Step S204).

Subsequently, the controller 9 determines whether the output voltage of the FC converter 3 is lower or not than the minimum voltage that can be boosted by the Bat converter 5 (Step S205). When this determination results in YES (YES at Step S205), the controller 9 controls to boost the output voltage of the FC converter 3 to the minimum voltage that can be boosted by the Bat converter 5 (Step S206) and to boost the output voltage of the Bat converter 5 to the minimum voltage that can be boosted by the Bat converter 5 (Step S207). Then, the controller 9 shifts to the processing at Step S208 described later.

On the other hand, when the determination at Step S205 results in that the output voltage of the FC converter 3 is the minimum voltage that can be boosted by the Bat converter 5 or more (NO at Step S205), the controller 9 controls to boost the output voltage of the Bat converter 5 to the output voltage of the FC converter 3 (Step S208).

Subsequently, the controller 9 determines whether the output voltage difference between the FC converter 3 and the Bat converter 5 is a predetermined value or less (Step S209). When this determination results in NO (NO at Step S209), the controller 9 adjusts either the output voltage of the FC converter 3 or the output voltage of the Bat converter 5 (Step S211) and shifts to the processing at the aforementioned Step S209. Herein, the output voltages may be adjusted by the processing of Steps S105 to S107 (see FIG. 2) described above in Embodiment 1.

On the other hand, when the determination at Step S209 results in that the output voltage difference is the predetermined value or less (YES at Step S209), the controller 9 turns the FC relays R1, R2 ON (Step S210).

As stated above, when the output voltage of the FC converter 3 set at the open circuit voltage of the fuel cell 2 is lower than the minimum voltage that can be boosted by the Bat converter 5, the fuel cell system 1 of Embodiment 2 can adjust the output voltages of the FC converter 3 and the Bat converter 5 to the minimum voltage that can be boosted by the Bat converter 5.

With this configuration, at the time of connection of an electric power supply path, after the output voltage difference between the FC converter 3 and the Bat converter 5 (voltage difference across the FC relays R1, R2) is set at a predetermined value or less capable of turning the FC relays R1, R2 ON without causing welding of the FC relays R1, R2, then the FC relays R1, R2 can be turned ON. As a result, the FC relays R1, R2 can be turned ON without welding.

Embodiment 3

The following describes Embodiment 3 of the present invention. In the aforementioned fuel cell system 1 of Embodiment 2, when the output voltage of the FC converter 3 is lower than the minimum voltage that can be boosted by the Bat converter 5, the output voltages of the FC converter 3 and the Bat converter 5 are boosted up to the minimum voltage that can be boosted by the Bat converter 5. A fuel cell system of Embodiment 3 is different in that, when the output voltage of the FC converter 3 is lower than the minimum voltage that can be boosted by the Bat converter 5, the battery voltage is lowered by electric vehicle (EV) mode travelling.

The fuel cell system in Embodiment 3 has a similar configuration to that of the fuel cell system in Embodiment 1 illustrated in FIG. 1. Therefore, the same reference numerals are assigned to the constituent elements and the description thereof is omitted. In the following, different points from Embodiment 1 are mainly described.

When the fuel cell system 1 starts, the controller 9 sets the output voltage of the Bat converter 5 at an open circuit voltage of the battery 4 and sets the output voltage of the FC converter 3 at an open circuit voltage of the fuel cell 2. Subsequently, when the output voltage of the FC converter 3 is lower than the minimum voltage that can be boosted by the Bat converter 5, the controller 9 controls to start travelling in an EV mode. The EV mode is a driving mode where the output of the fuel cell 2 is stopped and the vehicle travels by the output of the battery 4. The travelling in the EV mode lowers the open circuit voltage of the battery 4, and accordingly lowers the minimum voltage that can be boosted by the Bat converter 5 also. The controller 9 continues the EV mode travelling until the minimum voltage that can be boosted by the Bat converter 5 becomes the output voltage of the FC converter 3 or less.

When the output voltage of the FC converter 3 is the minimum voltage that can be boosted by the Bat converter 5 or more, the controller 9 controls to boost the output voltage of the Bat converter 5 to the open circuit voltage of the fuel cell 2 that is the output voltage of the FC converter 3.

Thereafter, when the output voltage difference between the output voltage of the FC converter 3 and the output voltage of the Bat converter 5 is a predetermined value or less, the controller 9 turns the FC relays R1, R2 ON. As a result, the FC relays R1, R2 can be turned ON while both ends of each of the FC relays R1, R2 are at a substantially same electric potential.

On the other hand, when this output voltage difference is the predetermined value or more, the controller 9 adjusts either the output voltage of the FC converter 3 or the output voltage of the Bat converter 5 until the output voltage difference is the predetermined value or less.

Figure 4:
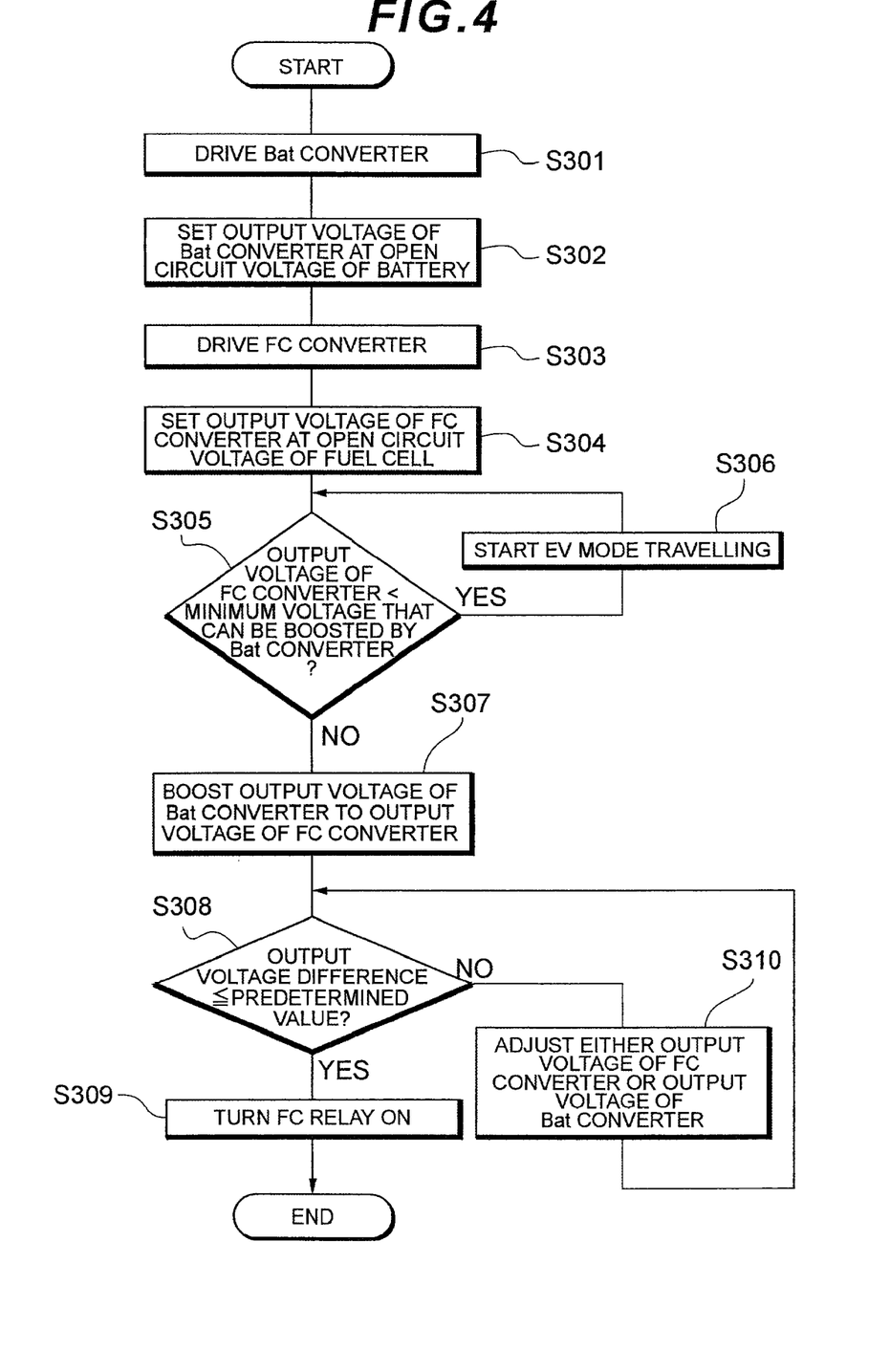
FIG. 4 is a flowchart to describe the flow of FC relay control processing in Embodiment 3.

Referring next to a flowchart of FIG. 4, the FC relay control processing in Embodiment 3 is described below. This FC relay control processing is started when an ignition key is turned ON, for example. When the ignition key is turned ON, the FC relays R1, R2 are in an OFF state.

Firstly, the controller 9 drives the Bat converter 5 (Step S301) and sets the output voltage of the Bat converter 5 at an open circuit voltage of the battery 4 (Step S302).

Subsequently, the controller 9 drives the FC converter 3 (Step S303), and sets the output voltage of the FC converter 3 at an open circuit voltage of the fuel cell 2 (Step S304).

Subsequently, the controller 9 determines whether the output voltage of the FC converter 3 is lower or not than the minimum voltage that can be boosted by the Bat converter 5 (Step S305). When this determination results in YES (YES at Step S305), the controller 9 controls to start travelling in the EV mode (Step S306). Then, the controller 9 shifts to the processing at Step S305 described above.

On the other hand, when the determination at Step S305 results in that the output voltage of the FC converter 3 is the minimum voltage that can be boosted by the Bat converter 5 or more (NO at Step S305), the controller 9 controls to boost the output voltage of the Bat converter 5 to the output voltage of the FC converter 3 (Step S307).

Subsequently, the controller 9 determines whether the output voltage difference between the FC converter 3 and the Bat converter 5 is a predetermined value or less (Step S308). When this determination results in NO (NO at Step S308), the controller 9 adjusts either the output voltage of the FC converter 3 or the output voltage of the Bat converter 5 (Step S310) and shifts to the processing at the aforementioned Step S308. Herein, the output voltages may be adjusted by the processing of Steps S105 to S107 (see FIG. 2) described above in Embodiment 1.

On the other hand, when the determination at Step S308 results in that the output voltage difference is the predetermined value or less (YES at Step S308), the controller 9 turns the FC relays R1, R2 ON (Step S309).

As stated above, when the output voltage of the FC converter 3 set at the open circuit voltage of the fuel cell 2 is lower than the minimum voltage that can be boosted by the Bat converter 5, the fuel cell system 1 of Embodiment 3 controls to consume electric power of the battery 4 until the minimum voltage that can be boosted by the Bat converter 5 becomes the output voltage of the FC converter 3 or less, and then can adjust the output voltages of the FC converter 3 and the Bat converter 5 to the output voltage of the FC converter 3.

With this configuration, at the time of connection of an electric power supply path, after the output voltage difference between the FC converter 3 and the Bat converter 5 (voltage difference across the FC relays R1, R2) is set at a predetermined value or less capable of turning the FC relays R1, R2 ON without causing welding of the FC relays R1, R2, then the FC relays R1, R2 can be turned ON. As a result, the FC relays R1, R2 can be turned ON without welding.

The FC relay control processing in Embodiment 3 has been described with reference to the FC relay control processing in Embodiment 2. However, such a description may be with reference to the FC relay control processing in Embodiment 1. More specifically, when it is determined that the output voltage of the FC converter 3 is lower than the output voltage of the Bat converter 5 at Step S105 of FIG. 2 (YES at Step S105), the controller 9 may control to start the travelling in the EV mode, and may continue the EV mode travelling until the output voltage of the Bat converter 5 becomes the output voltage of the FC converter 3 or less.

Embodiment 4

The following describes Embodiment 4 of the present invention. In the aforementioned fuel cell system of Embodiment 1, the FC converter 3 and the Bat converter 5 are controlled in the FC relay control processing while keeping the Bat relays R3, R4 ON. A fuel cell system of Embodiment 4 is different in that after the output voltage of the Bat converter 5 is set at the open circuit voltage of the battery 4, then the Bat relays R3, R4 are turned OFF.

The fuel cell system in Embodiment 4 has a similar configuration to that of the fuel cell system in Embodiment 1 illustrated in FIG. 1. Therefore, the same reference numerals are assigned to the constituent elements and the description thereof is omitted. In the following, different points from Embodiment 1 are mainly described.

When the fuel cell system 1 starts, the controller 9 sets the output voltage of the Bat converter 5 at an open circuit voltage of the fuel cell 2 or more and pre-charges the capacitor C4. The output voltage of the Bat converter 5 is set at the open circuit voltage of the fuel cell 2 or more because, when the difference between the open circuit voltage of the fuel cell 2 and the open circuit voltage of the battery 4 is smaller than the lower limit boosting voltage, the output voltage of the Bat converter 5 cannot be boosted up to the open circuit voltage of the fuel cell 2 and therefore the output voltage of the Bat converter 5 becomes the minimum voltage that can be boosted by the Bat converter 5. Therefore, the controller 9 sets the output voltage of the Bat converter 5 at either the open circuit voltage of the fuel cell 2 or the minimum voltage that can be boosted by the Bat converter 5.

After pre-charging the capacitor C4, the controller 9 turns the Bat relays R3, R4 OFF.

When the fuel cell system 1 starts, the controller 9 sets the output voltage of the FC converter 3 at an open circuit voltage of the fuel cell 2. When the output voltage difference between the output voltage of the FC converter 3 and the output voltage of the Bat converter 5 is a predetermined value or less, the controller 9 turns the FC relays R1, R2 ON. As a result, the FC relays R1, R2 can be turned ON while both ends of each of the FC relays R1, R2 are at a substantially same electric potential.

On the other hand, when this output voltage difference is the predetermined value or more, the controller 9 drives the traction motor 7 to consume the electric power stored in the capacitor C4 until the output voltage difference becomes the predetermined value or less. Herein, turning OFF the Bat relays R3, R4 means that the output voltage of the Bat converter 5 changes similarly to the voltage of the capacitor C4. Therefore, as the electric power of the capacitor C4 is consumed, the voltage of the capacitor C4, i.e., the output voltage of the Bat converter 5 is lowered, and so the output voltage difference decreases.

In order to consume the electric power stored in the capacitor C4, the compressor CP may be driven instead of the traction motor 7, or both of the traction motor 7 and the compressor CP may be driven.

The output voltage of the Bat converter 5 can be lowered with the traction motor 7 in the following manner, for example. For the purpose of voltage drop, the controller 9 may perform PI (Proportional Integral) control on the basis of a voltage difference obtained by subtracting the voltage of the capacitor C4 (output voltage of the Bat converter 5) as an actual voltage from the open circuit voltage of the fuel cell 2 as a target voltage. When the voltage drop causes undershoot, the controller 9 may turn the Bat relays R3, R4 ON to pre-charge the capacitor C4 again, and then may turn the Bat relays R3, R4 OFF and perform the aforementioned voltage drop processing again.

Alternatively, in the aforementioned PI control, the target voltage may be set at a value higher than the open circuit voltage of the fuel cell 2 and the voltage may be dropped to the set value by PI control. The voltage drop from the set value to the open circuit voltage of the fuel cell 2 may be performed by dropping the voltage gradually within the range not causing undershoot.

Figure 5:
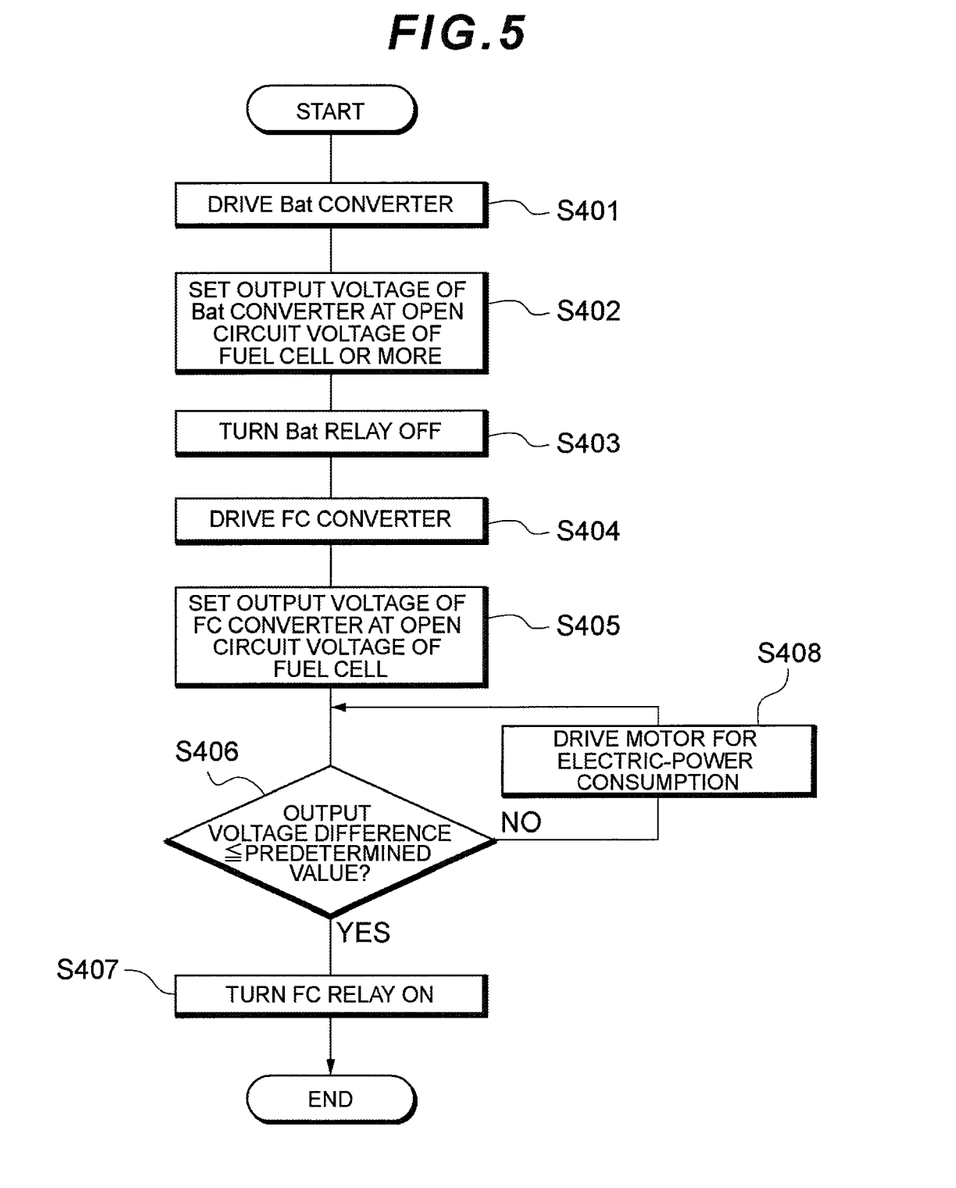
FIG. 5 is a flowchart to describe the flow of FC relay control processing in Embodiment 4.

Referring next to a flowchart of FIG. 5, the FC relay control processing in Embodiment 4 is described below. This FC relay control processing is started when an ignition key is turned ON, for example. When the ignition key is turned ON, the FC relays R1, R2 are in an OFF state.

Firstly, the controller 9 drives the Bat converter 5 (Step S401) and sets the output voltage of the Bat converter 5 at an open circuit voltage of the fuel cell 2 or more (Step S402). Thereafter, the controller 9 turns the Bat relays R3, R4 OFF (Step S403).

Subsequently, the controller 9 drives the FC converter 3 (Step S404) and sets the output voltage of the FC converter 3 at an open circuit voltage of the fuel cell 2 (Step S405).

Subsequently, the controller 9 determines whether the output voltage difference between the FC converter 3 and the Bat converter 5 is a predetermined value or less (Step S406). When this determination results in NO (NO at Step S406), the controller 9 drives the traction motor 7 to consume electric power stored in the capacitor C4 (Step S408). Then, the controller 9 shifts to the processing at Step S406 described above.

On the other hand, when the determination at Step S406 results in that the output voltage difference is the predetermined value or less (YES at Step S406), the controller 9 turns the FC relays R1, R2 ON (Step S407).

As stated above, when a difference (voltage difference) between the voltage of the capacitor C4 (output voltage of the Bat converter 5) set at the open circuit voltage of the fuel cell 2 or more and the output voltage of the FC converter 3 set at the open circuit voltage of the fuel cell 2 is a predetermined value or more, the predetermined value capable of turning the FC relays R1, R2 ON without causing welding, the fuel cell system 1 of Embodiment 4 drives the traction motor 7 until the voltage difference becomes the predetermined value or less, and thereafter can turn the FC relays R1, R2 ON. As a result, at the time of connection of an electric power supply path, the FC relays R1, R2 can be turned ON without welding.

Embodiment 5

The following describes Embodiment 5 of the present invention. In the aforementioned fuel cell system of Embodiment 4, when the open circuit voltage of the battery 4 is higher than the open circuit voltage of the fuel cell 2, the output voltage of the Bat converter 5 is dropped from the open circuit voltage of the battery 4 to the open circuit voltage of the fuel cell 2 or is boosted up to the minimum voltage that can be boosted by the Bat converter 5. The Bat converter 5, however, does not have a function to drop the open circuit voltage of the battery and output the resultant to the load side. Additionally, the efficiency will be degraded when the output voltage of the Bat converter 5 is boosted up to the minimum voltage that can be boosted by the Bat converter 5.

Then, the fuel cell system of Embodiment 5 controls the FC converter 3 and the Bat converter 5 so that the FC relay control processing can be executed effectively even when the open circuit voltage of the battery 4 is higher than the open circuit voltage of the fuel cell 2.

The fuel cell system in Embodiment 5 has a similar configuration to that of the fuel cell system in Embodiment 1 illustrated in FIG. 1. Therefore, the same reference numerals are assigned to the constituent elements and the description thereof is omitted. In the following, different points from Embodiment 1 are mainly described.

When the fuel cell system 1 starts, the controller 9 sets the output voltage of the Bat converter 5 at an open circuit voltage of the fuel cell 2 and then turns the Bat relays R3, R4 OFF. The controller 9 of Embodiment 5 is different from the controller 9 of Embodiment 4 in that, when the output voltage of the Bat converter 5 cannot be set at the open circuit voltage of the fuel cell 2, the open circuit voltage of the battery 4 as it is output as the output voltage of the Bat converter 5.

When the fuel cell system 1 starts, the controller 9 sets the output voltage of the FC converter 3 at an open circuit voltage of the fuel cell 2. When the output voltage difference between the output voltage of the FC converter 3 and the output voltage of the Bat converter 5 is a predetermined value or less, the controller 9 turns the FC relays R1, R2 ON. As a result, the FC relays R1, R2 can be turned ON while both ends of each of the FC relays R1, R2 are at a substantially same electric potential.

On the other hand, when this output voltage difference is the predetermined value or more, the controller 9 drives the traction motor 7 or the like to consume the electric power stored in the capacitor C4 until the output voltage difference becomes the predetermined value or less.

Figure 6:
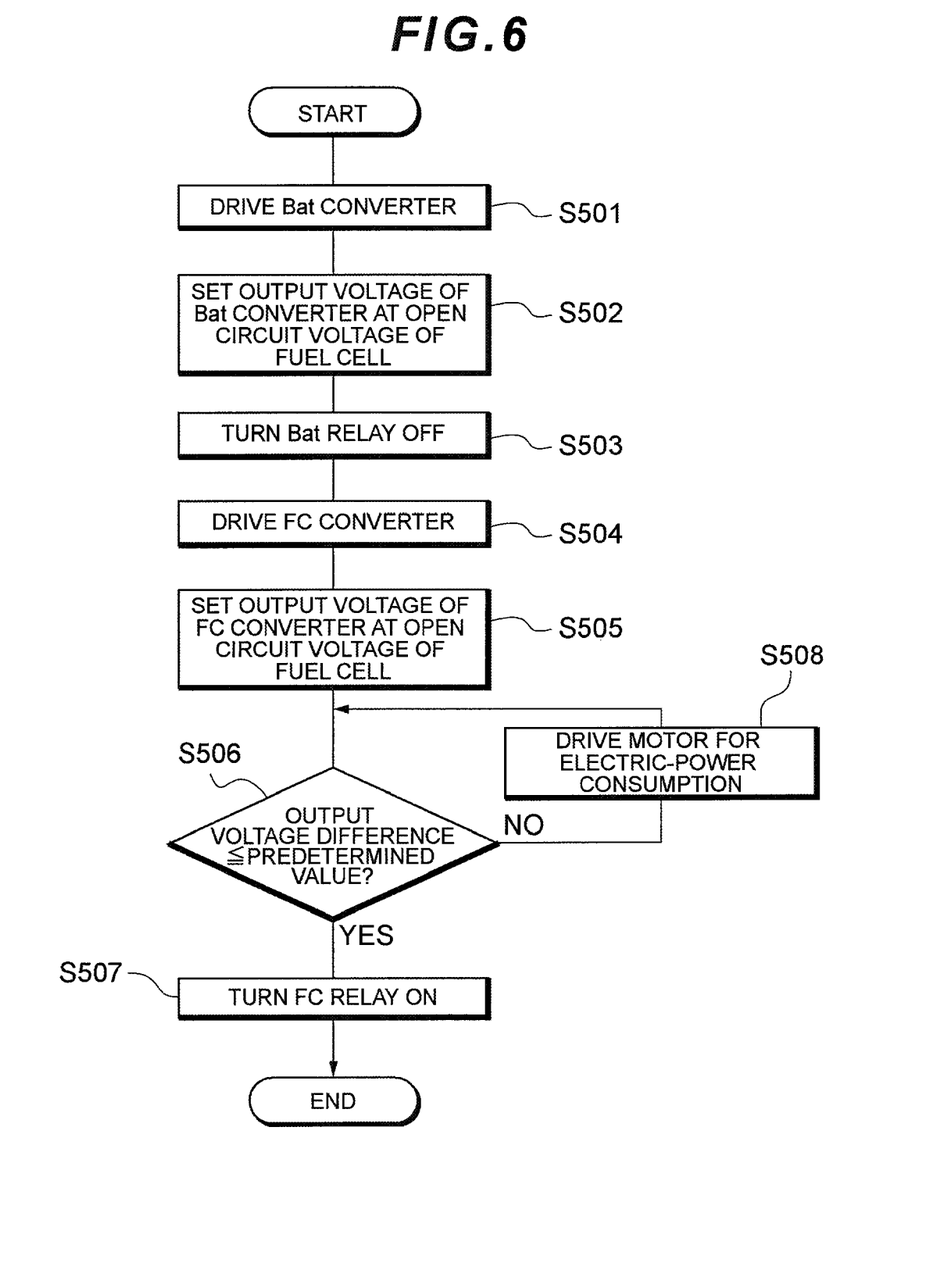
FIG. 6 is a flowchart to describe the flow of FC relay control processing in Embodiment 5.

Referring next to a flowchart of FIG. 6, the FC relay control processing in Embodiment 5 is described below. This FC relay control processing is started when an ignition key is turned ON, for example. When the ignition key is turned ON, the FC relays R1, R2 are in an OFF state.

Firstly, the controller 9 drives the Bat converter 5 (Step S501) and sets the output voltage of the Bat converter 5 at an open circuit voltage of the fuel cell 2 (Step S502). Thereafter, the controller 9 turns the Bat relays R3, R4 OFF (Step S503).

Subsequently, the controller 9 drives the FC converter 3 (Step S504) and sets the output voltage of the FC converter 3 at an open circuit voltage of the fuel cell 2 (Step S505).

Subsequently, the controller 9 determines whether the output voltage difference between the FC converter 3 and the Bat converter 5 is a predetermined value or less (Step S506). When this determination results in NO (NO at Step S506), the controller 9 drives the traction motor 7 to consume the electric power stored in the capacitor C4 (Step S508). Then, the controller 9 shifts to the processing at Step S506 described above.

On the other hand, when the determination at Step S506 results in that the output voltage difference is the predetermined value or less (YES at Step S506), the controller 9 turns the FC relays R1, R2 ON (Step S507).

As stated above, when a difference (voltage difference) between the voltage of the capacitor C4 (output voltage of the Bat converter 5) assumed to be set at the open circuit voltage of the fuel cell 2 and the output voltage of the FC converter 3 set at the open circuit voltage of the fuel cell 2 is a predetermined value or more, the predetermined value capable of turning the FC relays R1, R2 ON without causing welding, the fuel cell system 1 of Embodiment 5 drives the traction motor 7 until the voltage difference becomes the predetermined value or less, and thereafter can turn the FC relays R1, R2 ON. As a result, at the time of connection of an electric power supply path, the FC relays R1, R2 can be turned ON without welding.

INDUSTRIAL APPLICABILITY

Fuel cell systems according to the present invention are suitable to suppress weld at a connector on an electric power supply path.

DESCRIPTION OF REFERENCE NUMERALS

1 . . . fuel cell system, 2 . . . fuel cell, 3 . . . FC converter, 4 . . . battery, 5 . . . Bat converter, 6 . . . traction inverter, 7 . . . traction motor, 8*a*, 8*b* . . . auxiliary inverters, 9 . . . controller, C4 . . . capacitor, R1, R2 . . . FC relays, R3, R4 . . . Bat relays

The invention claimed is:

1. A fuel cell system, comprising:
   a fuel cell that receives fuel gas and oxidation gas and generates electric power through electrochemical reaction of the fuel gas and the oxidation gas;
   a storage section capable of charging with the electric power generated at the fuel cell;
   an electric power consumption device that consumes electric power from the fuel cell and the storage section;
   a first voltage converter disposed between the fuel cell and the electric power consumption device;
   a second voltage converter disposed between the storage section and the electric power consumption device;
   a connector that connects or disconnects a path, the path supplying electric power from the first voltage converter to the electric power consumption device and coupling the first voltage converter and the second voltage converter; and
   a controller that is programmed to control connection or disconnection of the path supplying electric power by the connector,
   wherein when the system starts, the controller is further programmed to compare an output voltage difference between the first voltage converter and the second voltage converter with a predetermined value that is set as a value at which welding of the connector occurs, and
   wherein the controller is further programmed to maintain the output voltage difference equal to or less than the predetermined value, and to subsequently connect the path,
   wherein the controller is further programmed to control the output voltage difference to be a predetermined value or less by boosting an output voltage of the first voltage converter.

2. The fuel cell system according to claim 1, wherein the output voltage difference is controlled to be a predetermined value or less by, when an open circuit voltage of the fuel cell is lower than an open circuit voltage of the storage section, boosting an output voltage of the first voltage converter to the open circuit voltage of the storage section.

3. The fuel cell system according to claim 1, wherein the controller is programmed to control the output voltage difference to be a predetermined value or less by, when an output voltage of the first voltage converter is lower than a minimum voltage that can be boosted by the second converter, boosting the output voltage of the first converter to the minimum voltage and boosting an output voltage of the second voltage converter to the minimum voltage.

4. The fuel cell system according to claim 1, wherein the controller is programmed to control to consume electric power of the storage section so as to make the output voltage difference a predetermined value or less.

* * * * *